Patented July 25, 1933

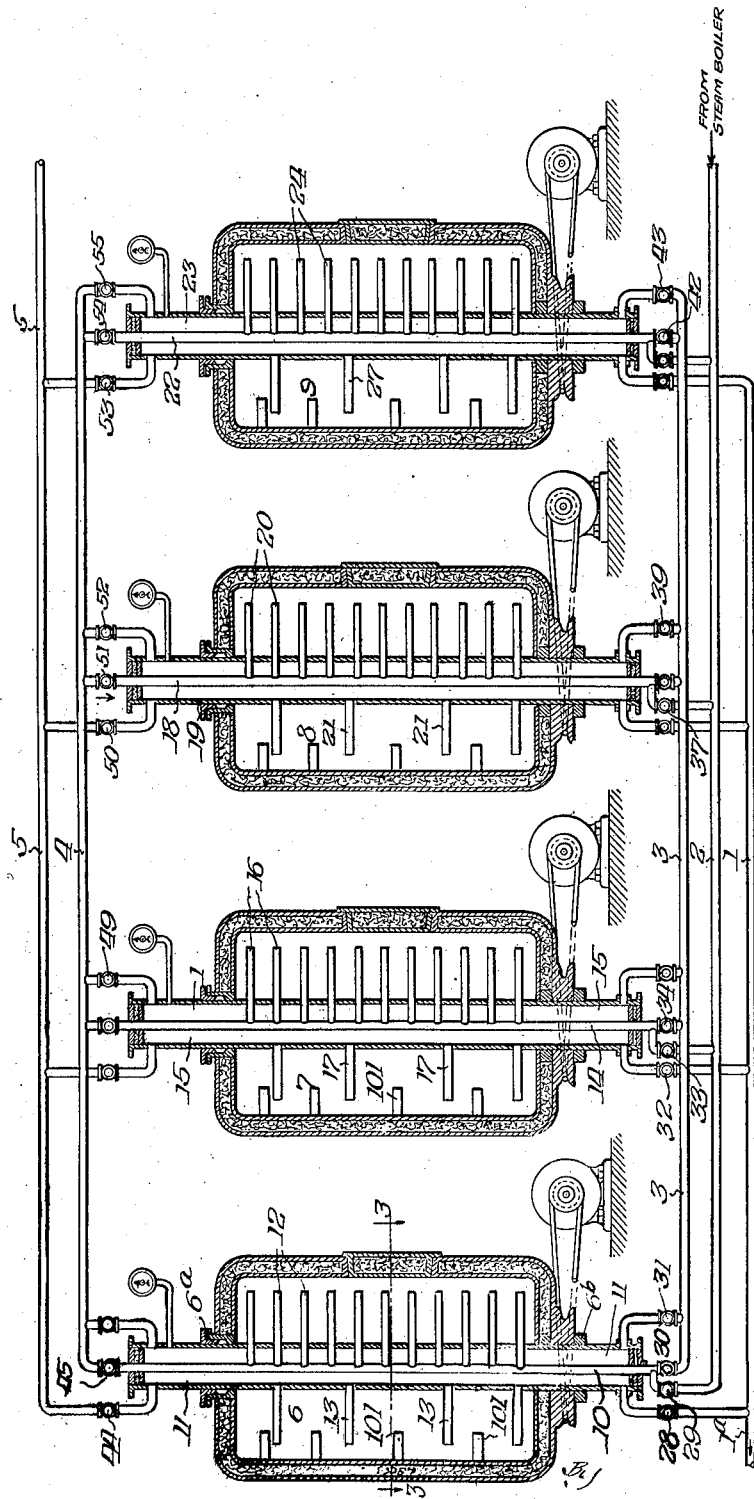

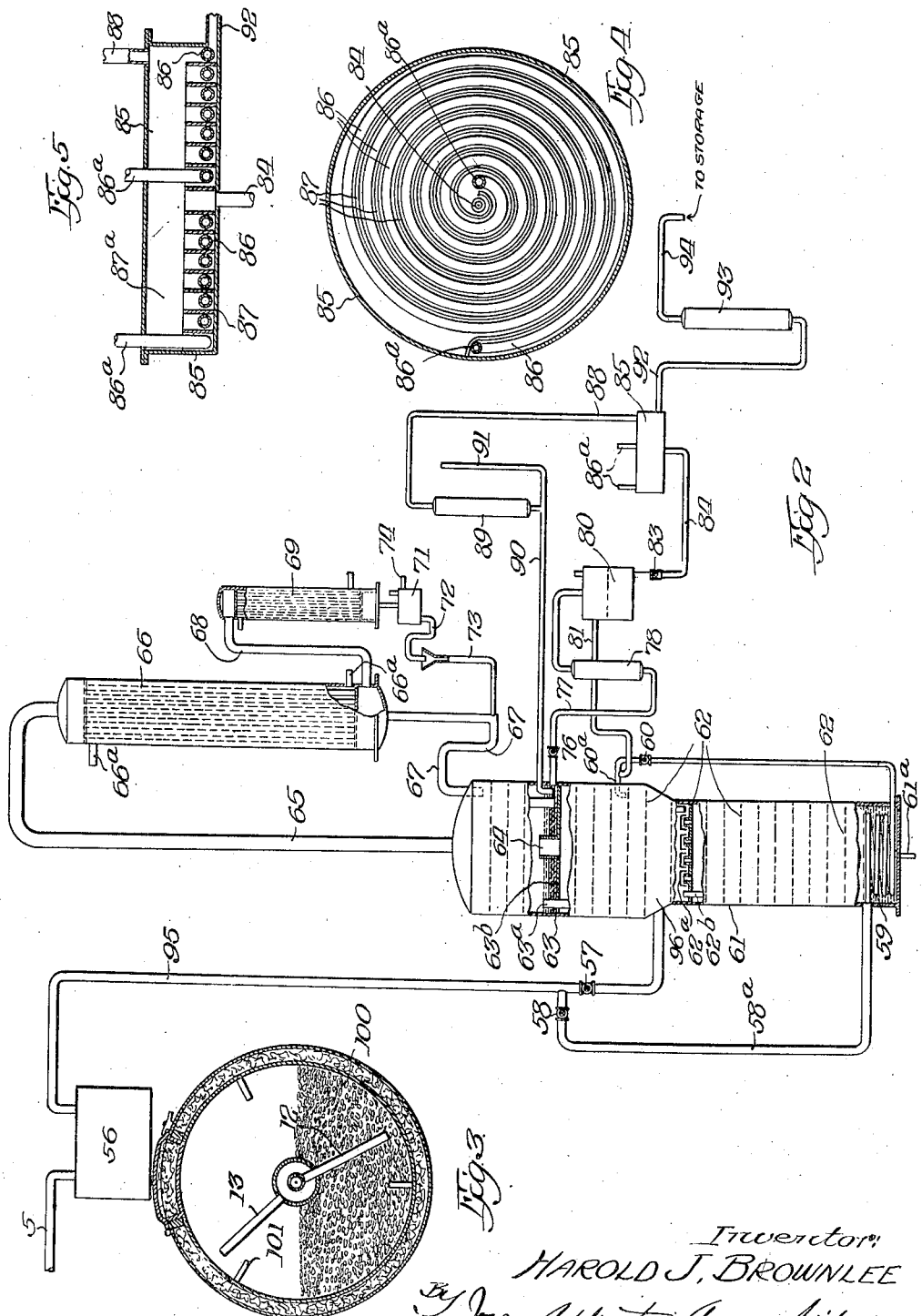

1,919,877

UNITED STATES PATENT OFFICE

HAROLD J. BROWNLEE, OF CEDAR RAPIDS, IOWA, ASSIGNOR TO QUAKER OATS COMPANY, OF CHICAGO, ILLINOIS, A CORPORATION OF NEW JERSEY

PROCESS FOR MANUFACTURING FURFURAL

Application filed January 26, 1927. Serial No. 163,587.

My invention relates to improvements in processes for manufacturing furfural or other volatile organic substances, and it has special reference to such a process that may be practiced on a commercial scale for producing economically the aforesaid substances.

More particularly my present invention relates to an improved process for manufacturing furfural and the like from furfural-yielding material, such as oat hulls, whereby furfural may be produced and recovered in quantities commensurate with commercial requirements at the expense of relatively low steam consumption.

One object of my present invention is to provide an improved process as identified above which allows of the efficient utilization in the process of the heat units and of the furfural-carrying power of the steam that is employed for forming and removing the furfural from the furfural-yielding materials.

Another object of my invention is to provide an improved process and apparatus of the character indicated which permits the separation of water from crude furfural in a continuous manner whereby substantially anhydrous furfural may be economically produced.

A further object of my invention is to provide an apparatus comprising a plurality of digesters or autoclaves having interconnections therebetween for permitting the economical utilization of the heat units supplied to the system, as well as the furfural-carrying power of the steam that is employed for treating the furfural-yielding materials contained in the digesters.

A still further object of my invention is to provide a process and an apparatus for practicing the same whereby continuous fractional distillation of the furfural-laden vapors emitted from the digester or digesters may be carried on, the heat necessary therefor being supplied by the said furfural-laden vapors themselves.

Another object of my invention is to provide a continuous fractional distilling column that can be operated in conjunction with one or more digesters and wherein the furfural can be separated from the vapors emitted from the digester or digesters by using these vapors as the source of heat for the fractional distilling column in which such vapors are fractionated.

A still further object of this present invention is to provide an economical apparatus for the efficient separation of the water from crude furfural in a continuous manner whereby substantially anhydrous furfural may be produced continuously.

The aforesaid apparatus, including the distilling column, forms the subject matter of my divisional co-pending application Serial No. 651,375, and filed on January 12, 1933.

Heretofore furfural has been obtained by treating furfural-yielding material in the presence of an acid at or above a temperature approximating 100° C. Furfural thus formed is preferably removed from the reaction chamber either by boiling the dilute acid used with the furfural-yielding material, or by passing a current of steam through the furfural-yielding material which has been dampened with dilute acid. The latter process which employs dilute acid for dampening the furfural-yielding materials is described in Letters Patent No. 1,735,084 to Carl S. Miner and the present applicant.

It is to be understood, however, that the process and apparatus of my present invention are not to be limited to manufacturing furfural from material that has been only dampened, as described above, since my present invention may be employed with satisfactory results when the furfural-yielding material is immersed in a liquid bath of such ample quantity that free liquid is present in the reaction chamber. However, for the sole purpose of describing a specific illustrative embodiment of my present invention whereby a better understanding of the nature, scope and characteristic features thereof may be had, I describe herein a method of preparing the raw furfural-yielding material similar to that described in the aforementioned copending application but it is obvious, of course, that the furfural-yielding material contained in the digster or digesters of my present apparatus need not necessarily be prepared so that it is merely dampened with the dilute acid solution.

A process for manufacturing furfural, wherein the raw material is completely covered with a dilute acid solution and the furfural is removed therefrom, produces a very low concentration of furfural in the distillate and, in this circumstance, the steam requirements per pound of furfural produced are extremely large. The cost of manufacturing furfural, when the material undergoing treatment is completely immersed in a liquid bath as mentioned above, is excessive and for this reason has not been employed, as far as I am aware, for the commercial production of furfural. When the furfural-yielding material is merely dampened with a dilute acid solution thereby substantially eliminating all free liquid, the steam requirements for producing furfural are greatly reduced over the first described process, but even in this last-described process, the steam requirements are large which circumstance adds to the cost of manufacturing furfural. In the use of the foregoing described processes where one digester only has been used, the furfural content of the vapors emitted from the reaction chamber varies between wide limits during the digestion of the materials being processed. The maximum furfural content of the emitted vapors from the reaction chamber during the fore part of the digestion may be as high as 8 per cent to 10 per cent, but as the digestion of the materials progresses, the furfural content of the vapors fall and, in the latter stage of the digestion may fall below one per cent. With a distillate having a 10 per cent furfural content, approximately 9 to 10 pounds of steam are required to remove one pound of furfural from the reaction chamber, while with a distillate having a one per cent furfural content, approximately 99 to 100 pounds of steam are required to remove one pound of furfural from the reaction chamber. It is evident, therefore, that the furfural content of the distillate from the reaction chamber should be kept as high as possible if the steam requirements are to be kept to a minimum. None of the processes heretofore practiced for producing furfural has yielded a distillate from a single reaction chamber that is even approximately uniformly rich in furfural throughout the period of digestion. Consequently, the furfural-carrying power of the steam has not been fully utilized in the prior processes and, therefore, the steam requirements of such processes have been large.

In the process of my present invention I prefer to add dilute acid to the furfural-yielding materials in the digester and then to pass steam or steam containing furfural continuously through them. The steam or steam containing furfural functions in two ways: first, it heats the materials to and maintains them at the reaction temperature and, second it serves as a carrying agent to remove the furfural as rapidly as possible from the reaction zone. My experience has shown that a small portion only of the steam used in the process is necessary to maintain the reaction temperature and that most of the steam passing through the furfural-yielding materials serves merely for the removal of the furfural from the reaction chamber.

The wide variation in the furfural content of the distillate in processes heretofore used, as explained above, demonstrates that the furfural-carrying power of the steam has not been fully utilized. The vapors from a single reaction chamber, where the processes of the prior art are employed, contain relatively small quantities of furfural in addition to large quantities of heat units, which heat units heretofore have not been utilized for making additional furfural in a second reaction chamber or for removing furfural therefrom after having been formed in said second reaction chamber. Therefore, it is one of the aims of my present invention to utilize more fully than heretofore the heat units contained in the vapors emitted from a reaction chamber, as well as the furfural-carrying power of such vapors.

In my improved process, I accomplish the aforesaid aims by utilizing two or more reaction chambers or digesters through which the steam or vapor is passed successively or in seriatim, said digesters being charged with furfural-yielding material and a liquid, preferably a dilute acid solution. It is to be noted that the quantity of the liquid contained in the digesters may be just enough to dampen the materials being processed or may be in excess of such a quantity. During the first part of the digestion period and while the vapors emitted from the digester are rich in furfural, I may pass these vapors directly to a distilling apparatus. When the furfural-laden vapors from the first digester have fallen materially below their maximum furfural content, which occurs as the digestion progresses, they are passed into a second digester which is connected in series relationship with the first digester and contains a fresh charge of furfural-yielding material and dilute acid. In passing through this second digester, the heated furfural-laden vapors emitted from the first digester serve to heat the materials contained in the second digester to maintain them at substantially the reaction temperature and to remove therefrom the furfural formed in the second digester. I have found that the vapors emitted from the second digester, connected in such series relationship with the first digester as explained above, are much richer in furfural than the vapors emitted from the first digester and admitted into the second digester.

Of course, it is obvious that more than two digesters may be connected in series relationship and I have, in the specific embodiment of my invention described herein, shown a battery of four digesters, three of which may, if desired, be connected in series relationship in the manner described above in connection with two digesters.

The furfural content of the vapors emitted from the second digester increases to a maximum point and then declines as the digestion in the first and second digesters proceeds. When the furfural content of the vapors has declined somewhat below the maximum point, the vapors emitted from the second digester are then passed into a third digester containing a fresh charge of furfural-yielding materials and dilute acid solution. In passing through the third digester, which is now operating in series relationship with the aforementioned first and second digesters, the vapors injected into the third digester, heat the charge to and maintain it at the reaction temperature and remove from the materials contained in the third digester the furfural formed therein. The vapors emitted from the third digester in the series are much richer in furfural than the vapors introduced into the third digester from the second digester. The vapors from the third digester, substantially uniformly high in furfural, may be led directly to the distillating apparatus.

Steam is passed through the materials being processed in the first digester in the series until substantially all of the furfural has been removed therefrom. This digester is then shut down by manipulating the necessary control valves and live steam is then passed directly into the second digester in the series, and the vapors from the second digester are then introduced into the third digester in the series, and the fourth digester, now being cut into the series, receives the vapors from the third digester. This sequence of operation continues until the furfural developed in the second digester becomes substantially negligible whereupon the aforesaid first digester, which has now been emptied and recharged, is now connected in series relationship with the third digester and fourth digester and receives the vapors from the fourth digester. In this manner, three digesters of a battery of four digesters are always connected in series relationship with one another through which the furfural-laden vapors emitted from one digester pass in series through the other two digesters connected in series therewith.

It will be apparent that in the process of my present invention, as outlined above, the vapors from the partly spent materials in one digester are utilized to form additional furfural in a fresh charge, as well as to remove furfural therefrom. If desired, the last trace of furfural may be removed from each spent charge. It will be apparent that in forming and removing the furfural in a digester connected in series with another digester, as explained above, the vapors are thereby enriched in their furfural content and the steam requirements for forming and removing the furfural from the reaction materials or charges are very greatly reduced by the process of my present invention.

In the drawings, Figures 1 and 2 are a diagrammatic representation of an apparatus embodying my invention and by means of which my improved process may be practiced, the system of Fig. 2 being a continuation of the system shown in Fig. 1 and constituting that portion in which the furfural-laden vapors are treated subsequent to their being emitted from the digesters of Fig. 1.

Fig. 3 is a cross-sectional view taken along the line 3—3 of digester 6 shown in Fig. 1 showing the means by which the charge or materials being processed are thoroughly admixed or impregnated with the vapors entering through the pipes 12. Fig. 4 is a plan view of a still or "dryer", which apparatus is instrumental in forming substantially anhydrous furfural, and Fig. 5 is a view, partially in elevation and partially in section, of the device shown in Fig. 4.

In Fig. 1 four separate digesters are shown, each of which may constitute a rotatable autoclave of any well known form of construction, such as is shown and described in the above-mentioned patent. Each autoclave is represented as being independently rotated by a separate motor. It is obvious, of course, that other means may be provided for rotating the digesters or autoclaves and for discontinuing the rotation of any digester at will in order that it may be charged with the materials to be processed and also that the residue contained therein may be removed after treatment. It will be obvious that the practice of my invention is not limited to digesters of the type described but that it is equally applicable to any type of autoclave provided with suitable means for bringing about intimate contact between the steam and the furfural-bearing material.

For the purpose of illustrating the operation of the system shown in Figs. 1 and 2, each of the digesters or autoclaves 6 7, 8 and 9 is charged with the furfural-yielding materials which, in one commercial application of my invention, may be oat hulls. In this circumstance, I elect to place a charge in each of the autoclaves comprising about 5000 pounds of oat hulls, 1250 pounds of water to which are added 100 pounds of concentrated sulfuric acid (95 per cent strength). The manholes of the autoclaves, as well as all control valves in the system, are first closed whereupon valves 57, 58, and 60, comprised in that portion of my system shown in Fig. 2, are regulated in conjunction with the continuous still or fractionating column 61 and the system of digesters 6, 7, 8 and 9 to allow the furfural-laden vapors to escape from the digesters when they are in operation at such a rate that the desired predetermined pressure will be maintained in the digesters. With the above-proportioned ingredients constituting the materials to be processed, and when employing oat hulls as the furfural-yielding substance, I prefer to operate the digesters at a temperature approximating 150° C. to 155° C. at 60 pounds gage pressure. After the digesters are charged they are rotated to ensure thorough mixing of the ingredients with the vapors. This continues during the operating period of each digester. It is to be understood, of course, that I am not to be limited to the use of the above-mentioned ingredients nor the specified proportions of them for practicing my present invention. For instance, I may substitute hydrochloric acid of 12 per cent to 20 per cent strength for the above-mentioned sulfuric acid while operating within a temperature range of substantially 103° C. to 110° C. at atmospheric pressure. It is also well known that I may operate within a temperature range approximating 170° to 180° C. and at a gauge pressure of from 125 to 135 pounds, when employing sulfuric acid in an amount approximately equal to 1 per cent by weight of a charge of corn cobs which are furfural-yielding materials. With these conditions, commercially satisfactory yields may be obtained with extremely low steam consumption. Again, when I use oat hulls as the furfural-yielding materials, I may employ sulfuric acid in a quantity of about 2 per cent of the weight of oat hulls and subject such materials to a temperature in the neighborhood of 150° C. to 155° C. whereupon similarly excellent results may be obtained. It is obvious that a very wide range of kinds and percentages of acid may be used to procure furfural from furfural-yielding materials providing the temperature and pressure of operation are adjusted. In view of the fact that furfural may be formed under such a wide range of conditions, it is to be understood that I do not wish to be limited in my present invention to any specific operating conditions as to materials to be treated, the acid to be used, the temperature at which the processing is to be carried on, or the pressure to which the materials are to be subjected.

Each of the autoclaves 6, 7, 8 and 9, when employing the specific quantity of oat hulls mentioned above, is about 12 feet long and 8 feet in diameter. The autoclaves 6, 7, 8 and 9 are shown as being rotatable about their horizontal axes and of similar construction. Referring to the digester 6, the trunnions 6a and 6b permit of the introduction of vapor or steam lines within the interior of the digester 6, the inlet pipes 10 and 12 being connected through valves with vapor lines 2, 3 and 4 and the outlet pipes 11 and 13 being connected through valves with vapor lines 1, 3, 4 and 5. The same is true of the digesters 7, 8 and 9. The vapor line 1 connects each digester through a valve to a condenser (not shown) through the extension 1a. The excess steam pressure in the digesters at the end of the digestion periods is released through the vapor line 1. The vapor line 2 is a pipe for leading live steam, under suitable pressure from a steam boiler (not shown), into the several digesters through suitable valves and pipes as will be hereinafter explained. The vapor lines 3 and 4 are adapted to interconnect the several digesters, as desired, with one another. The vapor line 5 is for the purpose of leading the furfural-laden vapors emitted from the digesters to the distilling apparatus of Fig. 2.

I propose, for the efficient commercial operation of my present process, that after the digesters are charged with the materials to be processed, the manholes and valves be closed except those valves connecting the interior of the digesters to the steam supply pipe 2. Steam is thus admitted into each digester for about 30 minutes and until a gage pressure of approximately 60 pounds within the digester is reached. The starting time of each digester is determined from the time that a pressure therein of 60 pounds has been reached. Each digester is rotated for a period of about 7½ hours while maintaining a steam pressure therein of approximately 60 pounds. After one of the digesters has been in operation for approximately 2½ hours under the conditions and circumstances mentioned above, a second digester, after being brought to 60 pounds pressure, is connected into the system. For instance, assuming that digester 6 is first placed in operation, digester 7 is connected into the system 2½ hours after digester 6 has been in operation. Digester 8 is then connected into the system 2½ hours after digester 7 has been connected thereto and digester 9 is connected into the system 2½ hours after digester 8. In the meantime, digester 6, which has been in operation for a period of 7½ hours, is disconnected from the system at the time digester 9 is connected thereto, is emptied, recharged and given the aforesaid preliminary treatment in order that it, digester 6, may be connected into the system 2½ hours after digester 9 has been connected into the system. In the foregoing manner, a cycle of operation for the battery of digesters is effected so that three digesters may be operated in seriatim at one time, while a fourth digester is being emptied, recharged and given the preliminary treatment in order that it may be connected into the system at the proper time. Assuming that digester 6 has been in operation 5 hours, that digester 7 has been in operation 2½ hours and that digester 8 has just been connected into the system, live steam enters the digester 6 from the steam line 2, through valve 29, the pipe 10 and the plurality of pipes 12. The steam passing through the pipes 12 becomes thoroughly intermixed with the materials being processed because of the fact that the digester 6 is being rotated. The vapors emitted from the digester 6 contain from 1 to 2 per cent furfural and pass therefrom through the plurality of outlet pipes 13, the pipe 11, valve 31, the pipe line 3, through valve 34, the inlet pipes 14 and 16 into the digester 7. Here the vapors emitted from the digester 6 are thoroughly mixed with the charge contained within the rotating digester 7. The vapors in digester 7, which contain from 4 per cent to 6 per cent furfural, pass from digester 7 through outlet pipes 17 and 15, through valve 49, through pipe 4, valve 51, inlet pipes 18 and 20 into the digester 8. Here the vapors from digesters 7 and 6 are thoroughly intermixed with the charge contained within the rotating digester 8. The vapors from digester 8, which contain 8 to 10 per cent of furfural, pass therefrom through outlet pipes 21 and 19, through valve 50, through the pipe line 5 to the settling chamber 56 (see Fig. 2) and thence to the distilling apparatus. The pressures within the digesters 6, 7 and 8 are maintained preferably within a range of approximately 55 to 60 pounds, but it will be slightly higher in digester 6 than in digester 7 and slightly higher in digester 7 than in digester 8, but this pressure differential is effective in causing the vapors to flow in the manner indicated above. The steam passing into and through the digesters in series relation is so controlled that, under the conditions of operation and with the materials mentioned above, 2000 to 3000 pounds of steam per hour are employed. The pressure of the steam within the digesters and the rate of flow of the steam through the digesters are controlled by the regulating valves 57, 58, and 60 in conjunction with the valve 29. The three digesters 6, 7 and 8 are each operated, as mentiond above, for 7½ hours, digester 6 having been in operation 2½ hours before digester 7 is connected into the system and digester 7 having been in operation 2½ hours before digester 8 is connected into the system and digester 8 having been in operation 2½ hours before digester 6 is disconnected from the system and digester 9 is connected into the system. At the start of this period of operation described above, the vapors from digester 6, when operating with the materials and under the conditions hereinbefore specified, have a furfural content of from 1 per cent to 2 per cent. The vapors from digester 7 have a furfural content of from 4 per cent to 6 per cent, and the vapors from digester 8 have a furfural content of from 8 per cent to 10 per cent. After the digester 6 has been in operation for substantially 7½ hours, the vapors therefrom are substantially free from furfural; after the digester 7 has been in operation for substantially 5 hours the vapors therefrom contain substantially from 1 to 2 per cent of furfural, and after the digester 8 has been in operation for 2½ hours the vapors therefrom contain substantially from 4 to 6 per cent of furfural. It will be seen, therefore, that digesters 6, 7 and 8 are connected in series relationship and operate in unison for a period of 2½ hours, but that each digester is being processed for a period of 7½ hours.

After the digester 6 has been in continuous operation for 7½ hours, it is disconnected from the system by closing valves 29 and 31. At this juncture, live steam from the pipe line 2 is directly admitted into digester 7 through the valve 33 and the pipes 14 and 16. At the same time, valve 50, which previously has allowed the vapors from digester 8 to flow into the pipe line 5, is closed and the vapors from digester 8 are then conducted into digester 9 by opening the valves 39 and 42. Valve 53 is also opened in order to permit the vapors from digester 9 to flow into the pipe line 5. In the foregoing manner, digester 6 is disconnected from the system and digester 9 is connected in series relationship with digesters 7 and 8. The three digesters 7, 8 and 9 are operated together for a two and one-half hour period similar to the manner of operation of the digesters 6, 7 and 8, as described above. The vapors emitted from digester 9 contain 8 to 10 per cent furfural for a time and then this furfural content declines in a manner similar to the decrease in the furfural content of the vapors emitted from the digester 8, as explained above.

While digesters 7, 8 and 9 are in operation, the steam pressure in digester 6 is released by opening the valve 28 and when atmospheric pressure within the digester 6 is reached, the valve 28 is closed and the digester 6 is then emptied and recharged for the purpose of connecting it into the system at the proper time.

After the digesters 7, 8 and 9 have been in operation for a period of time whereby digester 7 has been connected into the system for 7½ hours, it is then disconnected and digesters 8, 9 and 6 are now operated in series, in the order named, for the ensuing 2½ hour period in a manner similar to that of the group comprising digesters 6, 7 and 8 and of the group comprising digesters 7, 8 and 9.

When the digester 7 is disconnected from the system, all the valves associated with this digester are closed and valve 32 is opened thereby connecting the digester 7 to the relief pipe line 1. Steam is then directly admitted into the digester 8 by opening valve 37. Steam thus flows through pipes 18 and 20 to impregnate thoroughly the reaction materials contained in the digester 8. The furfural-laden vapors from the digester 8 flow out through pipes 21, through pipe 19, through valve 39, through pipe 3, and are admitted into the digester 9 through the valve 42, and pipe 22, and pipes 24, the valve 53 of the digester 9 having been closed. Furfural-laden steam is now admitted into the digester 9 through the pipes 24 and the furfural-laden vapors from the digester 9 are withdrawn through the pipes 27, pipe 23, the valve 55, along the pipe 4, through the valve 45, and into the digester 6 through the pipe 10, and pipes 12. The furfural-laden vapor from the digester 6 flow therefrom through the pipes 13, the pipe 11, and valve 44 into the pipe line 5, whence they are led to the apparatus of Fig. 2.

From the foregoing it will be observed that the relief pipe line 1 is directly connected to the condenser, that the pipe line 5 serves to conduct the furfural-laden vapors from the digesters to the distilling apparatus, that the pipe line 2 is the steam supply line, and that the pipe lines 3 and 4 serve for interconnecting the digesters of the battery with one another, as desired.

While I have mentioned herein that the digesters are connected in the system and subjected to reaction conditions for certain definite periods of time, it is to be understood, of course, that this invention is not limited to a specific time of operation of any one of the digesters, either alone or in series relationship with the other digesters comprising the battery. The definite or specific periods of time referred to herein are merely for the purpose of illustration and to describe one method only of operating my present process.

I have hereinbefore described that when one of the digesters is charged in preparing it for operation, I preferably bring the steam pressure therein to the desired value by means of connecting the digester directly to the live steam line 2 but, of course, it is obvious that the pressure in the digester may be brought up to the proper value by admitting thereinto the vapors coming from the last digester in the series and before passing these vapors to the distilling apparatus.

By referring to Fig. 3 it will be observed that the pipes 12 and 13 extend radially from the central axes of the digester and are angularly disposed from each other. The material to be processed 100, which constitutes the furfural-yielding substance such as the oat hulls is thoroughly intermixed as the autoclave rotates by reason of the fact that the pipes 12 project into the mass of the material 100. Furthermore, paddles 101 are spaced around the periphery of the digester and are so positioned with respect to the pipe 12 and 13 that the paddles 101 pass freely between the spaces extending between the adjacent pipes 12 and the adjacent pipes 13. The paddles 101 rotate with the autoclave and, therefore, enhance the thorough intermixing of the materials 100. In the foregoing manner, the materials being processed are thoroughly intermixed with the steam or vapors emitted from the pipes 12.

I have shown a system in which three digesters may be operated continuously in series relation. It is to be understood, of course, that various modifications may readily be made in my system providing for the operation of two digesters in series, such as I have explained in connection with the digesters 6 and 7. Furthermore, it is obvious that more than three digesters may also be connected in series relation to operate together. In the system shown in Fig. 1, by using four digesters, I am permitted to operate three of the digesters continually in series relation, having one digester in reserve at all times so that this digester can be emptied and recharged, while the other three digesters are in operation. In this fashion, I am able to have three digesters continuously in operation, while the reserve digester is being emptied, recharged and the fresh charge therein initially treated for connecting the digester into the system at the proper time.

When I employ two or more digesters in series, each digester can be operated for a sufficient length of time to enable substantially all of the furfural to be removed from the material being processed, such as the oat hulls, since the dilute vapors from a nearly spent charge can be further utilized and enriched in the second digester connected in series with the first digester. In this manner, I am able to effect a maximum recovery of furfural at a very low cost. This advantage is an important one over the former processes that employed a single digester because when a single digester was used the amount of steam required for recovering the last portions of furfural in the nearly spent oat hulls was so great that it was not economical to remove the furfural therefrom after a certain percentage had been recovered.

After removing the furfural from the digesters by means of steam, it is always necessary to recover the furfural by separating it from the steam, and it is usual to separate this furfural by means of a distilling apparatus. While I have shown the distilling apparatus of Fig. 2 as being supplied with the vapors emitted from the digesters 6, 7, 8 and 9 of Fig. 1, it is to be understood that the apparatus of Fig. 2 may be employed whether one digester is used or a plurality of digesters are used and, therefore, my invention, as exemplified by the apparatus of Fig. 2, is not limited to a system for recovering furfural that comprises a plurality of digesters only.

In the prior processes for making furfural from furfural-yielding materials by boiling the materials with an excess of dilute acid under atmospheric pressure, the vapors issuing from the reaction vessel were led to a fractionating column and the furfural contained in the vapors was separated from the other volatile vapors. The liquid flowing down the fractionating column was returned to the reaction vessel. This process utilized a fractionating still of the discontinuous type for making and refining the furfural. However, such a process was not feasible for recovering and separating furfural if the pressures within the reaction vessel were materially greater than atmospheric because it was necessary then to operate the fractionating column at substantially the same pressure as that obtaining in the reaction vessel in order to return the reflux liquid to the reaction vessel or to employ a pump for forcing the reflux liquid back into the reaction vessel against the pressure obtaining therein. These disadvantages have generally precluded the foregoing process from being used commercially.

In my present process I prefer to charge the digester with furfural-yielding materials that have been mixed with a definite and predetermined quantity of dilute acid. It is obvious, therefore, that if the vapors emitted from the digesters are passed to a fractionating column and the reflux liquid therefrom returned to the digester, the liquid within the digester will be increased substantially beyond the desired quantity and, therefore, interfere with the efficient operation of the digester.

Heretofore, the furfural-bearing vapors emitted from a pressure digester have been first condensed and the condensed liquid subsequently treated in a distilling apparatus for the recovery of the furfural. By such a procedure the heat units contained in the furfural-bearing vapors have been dissipated in the condenser and have not been utilized in the fractionating column. Therefore, these heat units lost in the condenser have detracted from the heat efficiency of the system. Furthermore, the handling of the condensed liquid, the necessity of supplying storage tanks therefor, and the reheating of these liquids in the distilling apparatus are undesirable and uneconomical.

In my present process, as is exemplified by the system shown in Fig. 2, I employ the furfural bearing vapors emitted from the digesters, as the sole source of heat in a heating coil to furnish the heat necessary in the operation of a continuous still, in which I recover the furfural.

In the former processes five to fifteen pounds of steam have been required to separate one pound of furfural from the furfural-bearing distillate. Therefore, the advantages of employing my improved process will be apparent since I avoid this extra steam expenditure and, in addition, eliminate the handling and storage of the liquid condensate from the digesters.

The crude furfural obtained from the continuous still contains about 5 per cent water and traces of other low boiling constituents such as acetaldehyde, etc. The removal of these impurities from the crude furfural constituents the third step in my improved process. Heretofore these low boiling constituents or impurities have been removed by heating the crude furfural until subsantially anhydrous furfural remained in the distilling vessel. By this prolonged heating process the furfural in the distilling vessel became badly discolored and was generally not suitable for commercial use without being redistilled. This redistillation has been preferably done heretofore under a vacuum and this resulted in appreciable losses of the furfural. I have discovered that substantially anhydrous furfural of good color may be obtained by passing crude furfural over a heating coil comprised in my new apparatus, such as is shown in Figs. 4 and 5. This new apparatus permits of quickly heating the crude furfural whereby the water and low boiling constituents and some furfural distill therefrom, leaving behind the anhydrous furfural which is quickly cooled in order that material discoloration thereof is substantially precluded. In this fashion, the formation of undesirable products and the losses involved in redistillation are avoided.

For a detailed description of my improved distillation apparatus I have shown in Fig. 2 the pipe line 5 as being connected to a settling chamber 56 wherein the velocity of the vapors coming from the digester or system of digesters of Fig. 1 is reduced materially to allow any solid particles to settle out so that they will not be carried into the still. Any suitable settling, filtering or washing device may be used for this purpose. From this settling chamber 56 the vapors pass through the pipe 95 and the greater portion of these vapors are released to substantially atmospheric pressure through the valve 57 and fed into the chamber 96 of the fractional distilling column 61. However, a part of the vapors in the pipe 95, while still under pressure, is passed through the valve 58 and the pipe line 58a, through the heating coil 59 of the column 61, which heating coil, being immersed in the waste liquid, generates additional steam or vapor necessary to operate the fractionating column 61. The heat control of the coil 59 is regulated by keeping the pressure thereon at the desired point, perferably by means of the valves 58 and 60, although any other suitable pressure-regulating mechanism may be provided for this purpose. The vapors condensed in the heating coil 59 pass into the column 61 through the valve 60 and the exhaust pipe 60a. The steam generated by heating coil 59, which is immersed in the waste liquid in the bottom of the column, passes up the column, being intermixed in its travel upward with the downflowing liquid on the several plates and, being enriched in furfural by this action, joins the vapors from the digester in chamber 96, and together these vapors pass up the column, being intermixed with the down-flowing liquid on all the plates above chamber 96 except plate 63. The vapors issuing from the top of the fractionating column 61 pass through the vapor line 65 to the main reflux condenser 66 which may be of any of the usual forms of construction and, in this instance, is shown as being a water-cooled reflux condenser having inlet and outlet pipes 66a for the cooling water. The cooling surfaces within the reflux condenser 66 is ample to condense substantially all of the vapors. However, there are traces of low boiling liquids whose vapors are not condensed in the reflux condenser 66 but pass through the vapor line 68 to a second similarly constructed condenser 69. These low boiling constituents passing into the condenser 69 carry traces of furfural but substantially all of these vapors condense together. The condensate from the condenser 69 collects in a gravity separator 71 where furfural containing other volatile constituents separates out to form the bottom layer. This furfural layer collecting in the gravity separator 71 is returned through pipes 72, 73 and 67, wherein it meets the condensed liquid from the condenser 66. These combined liquids containing furfural return through pipe 67 to the top of the fractionating column 61 wherein the condensed liquids are subjected to a fractional distillation process. It will thus be seen that the vapors condensed in the condenser 66 are returned to the top of the fractionating column 61 through the pipe 67 and that this condensate constitutes all of the vapors passing into the condenser 66 except those vapors condensed in the auxiliary condenser 69. The condensed liquids from the condensers 66 and 69 are fed to the column 61 through the pipe 67 and these condensates containing the furfural flow down the column and are subjected to the fractionating process in their travel down the column and discharge from the bottom of the column substantially free from furfural.

The distilling column 61 comprises a plurality of superposed decks 62 which subdivide the column in a series of compartments. Each deck 62 is shown as being provided with boiling caps 62a and down-pipes 62b which are shown diagrammatically in the drawings. In the fractionating column the furfural content of the vapor and liquid is progressively richer toward the top of the column. It is known that at the boiling temperature and atmospheric pressure after a furfural concentration of 18.5% is reached, an excess of furfural above this concentration separates from the water containing furfural and a separate layer of furfural containing water results, the latter forming the bottom layer. A plate 63 is provided in the upper portion of the column and forms a gravity separating chamber, as indicated diagrammatically in the drawings. In this gravity separating chamber the furfural layer which separates in the column collects. The furfural layer collecting upon the plate 63 contains about 84 per cent furfural and 16 per cent water. The water layer contains about 18 per cent furfural and overflows into the column below by passing through the overflow pipe 63a where it is subjected to further fractionation. The furfural layer shown as 63b upon the plates 63 is withdrawn through the valve 76 and the pipe 77 to the cooler 78. On cooling this furfural some water containing furfural separates in the cooler 78 and forms two layers in the gravity separator 80, the top or water layer containing 8 to 9 per cent furfural and the bottom layer containing about 95 per cent furfural. The upper or water layer in the gravity separator 80 is returned to the column 61 through the pipe 81 where it is subjected to further fractionation. The furfural accumulating in the lower layer of the gravity separator 80 may be withdrawn continuously through the valve 83 and the pipe line 84 to the distilling device 85 which is shown more in detail in Figs. 4 and 5.

In the distilling apparatus 85, water and some of the furfural are removed and substantially anhydrous furfural is withdrawn therefrom by gravity through the pipe 92, the cooler 93 and the pipe 94 to a storage tank.

The apparatus 85 provides a closed chamber containing an inlet pipe 84 for the admission therein of crude furfural. A spiral heating coil 86 is disposed in the bottom of the chamber 85 and the convolutions thereof are separated from one another by means of a spiral baffle plate 87.

The coiled pipe 86 is provided with inlet and outlet openings 86a. An outlet pipe 88 leads from the chamber 85 to the condenser 89. The vapors condensed in the condenser 89 return to the fractionating column 61 through the pipe line 90. The usual vent 91 is provided for the condenser 89.

The furfural admitted to the chamber 85 contains about 95 per cent furfural and this furfural, by contacting with the spiral heating coil 86, is heated and sufficient steam pressure is used in heating the coil 86 to heat the furfural to about 160° C. before it leaves the chamber 85 through the pipe 92. On heating the crude furfural to this temperature in the chamber 85, substantially all the water and other volatile impurities are removed as vapor along with some furfural. These vapors pass through the vapor line 88 to the condenser 89, and the condensate formed in the condenser 89 returns to the fractionating column 61 through the pipe 90.

Substantially anhydrous furfural leaves the chamber 85 through the pipe 92, flowing through the cooler 93, the pipe 94 and into the storage tank (not shown).

Small quantities of highly volatile material, such as acetaldehyde, etc., are formed in the digestion process. These pass through the distilling column and the main condenser, and carry a small quantity of furfural into condenser 69. Most of the vapors entering condenser 69 are condensed therein and collect in gravity separator 71, and there separate into two layers, impure furfural forming the bottom layer and the more volatile materials containing small quantities of furfural forming the top layer. The more volatile materials, forming the upper layer in gravity separator 71, constitute only a few tenths of 1 per cent of the total vapors emitted from the fractionating column 61 and are withdrawn through pipe 74 to a separate tank (not shown). The furfural layer in gravity separator 71 is returned to the column 61, as above described.

It will be observed that in my process furfural is formed from furfural-yielding materials treated in a digester or digesters, as desired, and the furfural is continuously removed by steam in such a way that the vapors entering the line 5 are more uniform and richer in their furfural content than have been the furfural vapors obtainable by previous processes. It will be observed further that these vapors serve as a feed as well as a source of heat for the continuous fractional distilling column 61. Again, it will be noted that the furfural-bearing vapors from the top of the column 61 are substantially all condensed and the condensate returned to the column. The waste from the bottom of the column 61 is kept substantially free from furfural by carrying sufficient pressure of furfural-laden vapors on the heating coil 59. Two layers occur on the upper plates of the column, furfural containing water forming the bottom layer and water containing furfural forming the top layer.

As these flow down the column 61, the furfural layer collects on the plate 63. This plate contains no bubbling caps but the vapors from beneath pass through it by means of the pipe 64. The water layer on this plate overflows to the plate beneath it through the pipe 63a whereupon this overflow is subjected to further distillation.

Of course, it will be obvious that the heating coil 59 for the fractional distilling column 61 may be heated with live steam, but I prefer to heat it with the vapors containing furfural that are emitted from the digesters of Fig. 1. By operating in this way, I am able to produce furfural economically with a minimum steam expenditure and, moreover, I am able to separate the furfural from the steam emitted from the digesters without expending any extra heat units for the operation of the continuous fractionating column beyond those that are used in the digestion of the furfural-yielding materials. Also, that the removal of furfural from the digesters is accomplished with less steam consumed per pound of furfural removed than has been possible in the processes and apparatus heretofore employed.

While I have shown one embodiment of my invention, it is conceivable that many modifications may be made therein without departing from the spirit and scope of the appended claims.

I claim:

1. The process of manufacturing furfural which comprises treating a plurality of separate furfural-yielding reaction mixtures the state of reaction of each varying from that of the other, utilizing furfural-laden steam from a reaction mixture in a more advanced stage of reaction for heating a furfural-yielding reaction mixture in a less advanced stage of reaction, and then removing furfural therefrom.

2. The continuous process for manufacturing furfural which comprises passing steam through a plurality of digesters each being adapted to be connected in series relationship with the other and each digester containing a furfural-yielding reaction mixture, the state of reaction of each varying from that of the others and the steam passing through the said digesters in series from that digester in which the reaction mixture is in the most advanced stage of reaction towards that digester in which the reaction mixture is in the least advanced stage of reaction, and then disconnecting from the series that digester in which the reaction period has terminated and connecting in the series at the opposite end thereof a newly charged digester whereby operation may be repeated to constitute a continuous process.

3. The continuous process for manufacturing furfural which comprises passing steam through a plurality of digesters each being adapted to be connected in series relationship with the others and each digester containing a furfural-yielding reaction mixture, the state of reaction of each varying from that of the others and the steam passing through the said digesters in series from that digester in which the reaction mixture is in the most advanced stage of reaction towards that digester in which the reaction mixture is in the least advanced stage of reaction, then disconnecting from the series that digester in which the reaction period has terminated and connected in the series at the opposite end thereof a newly charged digester whereby uninterrupted operation may be repeated to constitute a continuous process, and then fractionating the vapors thus enriched with furfural by means of their own heat and without the addition of externally applied heat.

4. The continuous process for manufacturing furfural which comprises passing steam through a plurality of digesters each being adapted to be connected in series relationship with the other and each digester containing a furfural-yielding reaction mixture, the state of reaction of each varying from that of the others and the steam passing through the said digesters in series from that digester in which the reaction mixture is in the most advanced stage of reaction towards that digester in which the reaction mixture is in the least advanced stage of reaction, then disconnecting from the series that digester in which the reaction period has terminated and connecting in the series at the opposite end thereof a newly charged digester whereby uninterrupted operation may be repeated to constitute a continuous process, then fractionating the vapors thus enriched with furfural by means of their own heat and without the addition of externally applied heat and then removing water from the reaction products.

5. The continuous process for manufacturing furfural which comprises passing steam through a plurality of digesters each being adapted to be connected in series relationship with the others and each digester containing a furfural-yielding reaction mixture, the states of reaction of said mixtures being successively varied by substantially equal time increments, and the steam passing through the said digesters in series from that digester in which the reaction mixture is in the most advanced stage of reaction towards that digester in which the reaction mixture is in the least advanced stage of reaction, and then disconnecting from the series that digester in which the reaction period has terminated and connecting in the series at the opposite end thereof a newly charged digester whereby uninterrupted operation may be repeated to constitute a continuous process.

6. The process of manufacturing furfural which comprises impregnating a mass of furfural-yielding material with a quantity of suitable liquid to constitute a furfural-producing reaction mixture, subjecting this reaction mixture while in a less advanced stage of reaction to steam containing vaporized furfural derived from another furfural reaction mixture in a more advanced stage of reaction, withdrawing from the said first reaction mixture the vapors thus formed, and then separating the furfural from said vapors.

7. The process of manufacturing furfural which comprises impregnating a mass of furfural-yielding material with a quantity of suitable liquid to constitute a furfural producing reaction mixture, subjecting this reaction mixture while in a less advanced stage of reaction to the conjoint action of heat, pressure and a continuous supply of steam carrying furfural vapors derived from another furfural producing reaction mixture in a more advanced stage of reaction, and removing from the said first reaction mixture the vapors thus formed.

8. The process of manufacturing furfural which comprises impregnating a plurality of separate masses of furfural-yielding materials with a quantity of suitable liquid to form several furfural-producing reaction mixtures, subjecting one of said reaction mixtures while in an early reaction stage to the conjoint action of heat, pressure and a continuous supply of steam containing vaporized furfural derived from another of said reaction mixtures in an advanced stage of reaction, removing as formed the vapors thus generated in the said first reaction mixture, and then separating the furfural from said vapors.

9. The process of manufacturing furfural which comprises mixing a plurality of separate masses of furfural-yielding materials with a catalyst for the reaction and a quantity of suitable liquid to severally form a plurality of furfural-producing reaction mixtures, subjecting one of said reaction mixtures while in a less advanced stage of reaction to the action of heat, pressure, and a continuous supply of steam carrying vaporized furfural derived from another of said reaction mixtures at a more advanced stage of reaction for maintaining the reaction temperature of said first reaction mixture, removing the vapors from the said first reaction mixture substantially as quickly as formed, and then procuring the furfural from said vapors.

10. The process of manufacturing furfural from a plurality of separate furfural-yielding reaction mixtures wherein the states of reaction vary from one another which comprises subjecting progressively the reaction mixtures in the less advanced stages of reaction to the furfural-laden vapors evolved from the reaction mixtures in the more advanced stages of reaction.

11. The process of manufacturing furfural which comprises placing furfural-yielding reaction mixtures in a plurality of separate digesters each being adapted to be connected at will in series relationship with the others, admitting steam into one of said digesters and processing the furfural-yielding reaction mixture therein for a period of time, then delivering the furfural-laden vapors derived from said first digester to a second digester wherein the furfural-yielding reaction mixture is in a stage of reaction less advanced than that of the reaction mixture in said first digester, and then delivering the furfural-laden vapors from the said second digester to a third digester wherein the furfural-yielding reaction mixture is in a stage of reaction less advanced than that of the reaction mixture in said second digester.

12. The process of manufacturing furfural which comprises subjecting to furfural-producing reaction conditions separate charges of furfural-yielding materials that have been processed for varying periods and thereby contain varying quantities of furfural, and then progressively enriching the furfural content of the vapors emitted from the separate charges by introducing therein vapors emitted from that charge having the next lower content of furfural.

13. In a process for the manufacture of furfural, the step which comprises subjecting a mass of furfural-yielding materials in contact with an acid-furfural solution and in an advanced stage of reaction to the conjoint action of heat, pressure and a current of steam thereby forming furfural in said materials, said current of steam serving as a means for removing furfural from said materials, then passing the vapors emitted therefrom into another mass of furfural-yielding materials wherein the reaction has proceeded to a substantially less degree than in said first mass, and then withdrawing the vapors from said second mass.

HAROLD J. BROWNLEE.